United States Patent [19]

Krüger et al.

[11] Patent Number: 5,472,608
[45] Date of Patent: Dec. 5, 1995

[54] OVERFLOW SIEVE

[75] Inventors: Horst Krüger, Solingen; Harald Eickholt, Düsseldorf, both of Germany

[73] Assignee: Hein, Lehmann Trenn- Und Fordertechnik GmbH, Dusseldorf, Germany

[21] Appl. No.: 304,538

[22] Filed: Sep. 12, 1994

[30] Foreign Application Priority Data

Sep. 15, 1993 [DE] Germany .................. 43 31 107.5

[51] Int. Cl.[6] .................. B01D 29/13; B01D 39/10
[52] U.S. Cl. .................. 210/498; 210/162; 210/483; 209/273; 209/281; 209/405; 209/412
[58] Field of Search .................. 210/483, 498, 210/154, 162, 248; 209/273, 281, 405, 412

[56] References Cited

U.S. PATENT DOCUMENTS

| | | | |
|---|---|---|---|
| 1,185,620 | 6/1916 | Blum | 209/405 |
| 3,561,603 | 2/1971 | Salomon | 210/498 |
| 4,113,626 | 9/1978 | Detcher | 209/281 |
| 4,380,494 | 4/1983 | Wilson | 209/412 |
| 4,505,812 | 3/1985 | Lees | 209/405 |
| 4,529,520 | 7/1985 | Lampenius | 210/498 |
| 5,246,579 | 9/1993 | Probstmeyer | 210/483 |

FOREIGN PATENT DOCUMENTS

| | | | |
|---|---|---|---|
| 9001983 | 3/1990 | European Pat. Off. | 210/498 |
| 883346 | 11/1981 | U.S.S.R. | 210/483 |

Primary Examiner—Neil McCarthy
Assistant Examiner—Theodore M. Green
Attorney, Agent, or Firm—Herbert Dubno

[57] ABSTRACT

An overflow sieve in which the sieve bottom is in the form of a slotted hole sheet whose slots have a width less than 1.0 mm and a length of 0.5 to 4 mm or a fine hole sheet with noncircular holes of a greatest width or diameter of less than 2 mm.

9 Claims, 7 Drawing Sheets

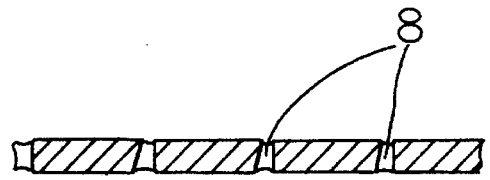
FIG. 8D
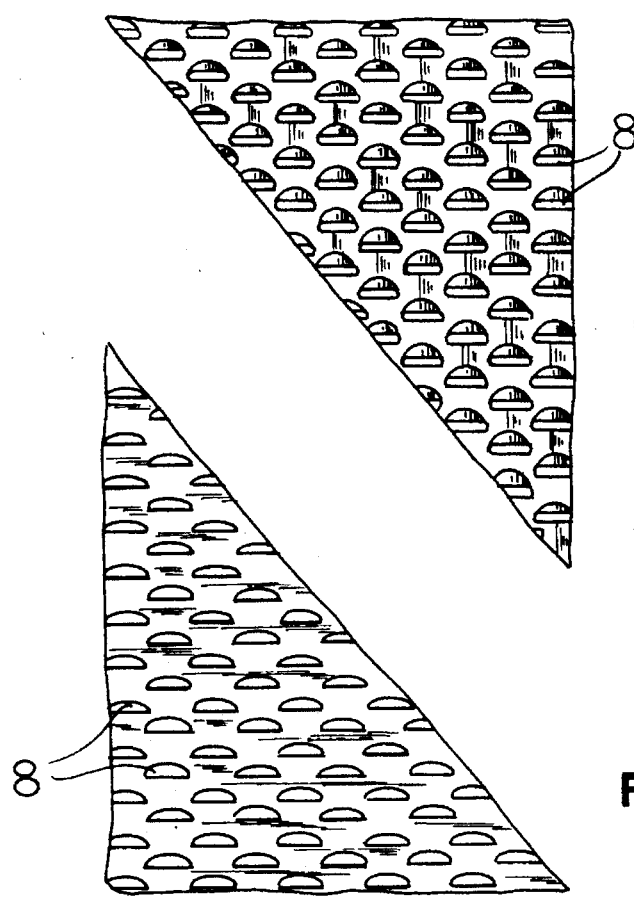
FIG. 8A
FIG. 8B
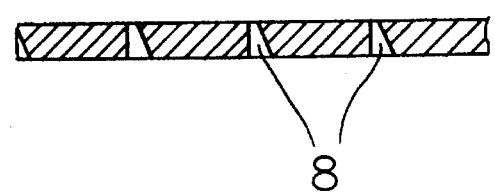
FIG. 8C

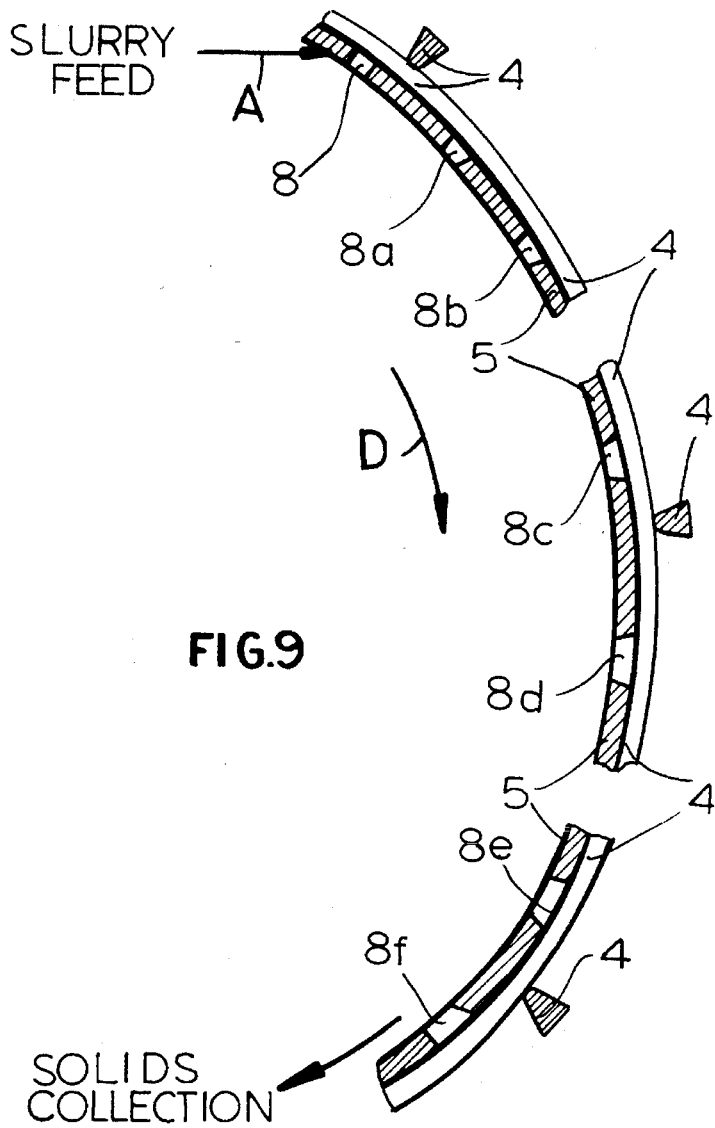
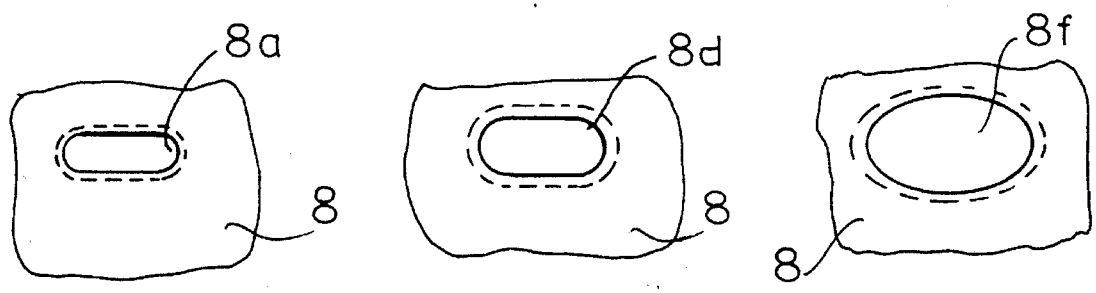

OVERFLOW SIEVE

FIELD OF THE INVENTION

Our present invention relates to an overflow sieve and, more particularly, to an arcuate sieve having an arched sieve bottom over whose concave surface the mixture of solids and liquid flows. The slurry can be fed to one end of the sieve bottom, the liquid phase can pass through the sieve to be collected at the convex side, and the solids can be collected from the concave side.

BACKGROUND OF THE INVENTION

It is known to provide overflow sieves, more particularly arcuate sieves, as a slotted sieve consisting of individual bars which are substantially triangular in cross section and which are welded in spaced parallel relationship onto a supporting construction so that the bars form between themselves narrower or wider gaps, depending on the mixture of solids and liquids to be sieved. Such slotted sieves are expensive to construct and assemble and must be changed together with the supporting construction during replacement. Furthermore, they can be adapted only to a limited extent to the various textures of the material to be sieved.

OBJECTS OF THE INVENTION

It is an object of the invention so to improve an overflow sieve of the kind specified that it is simple to manufacture, assemble and replace, while being simply and inexpensively adaptable to the most varied materials to be sieved.

Another object of the invention is to keep the open surface of the sieve substantially free from blinding.

Yet another object of this invention is to provide an overflow sieve which is free from the drawbacks of earlier systems, especially with respect to ease of the replacement of the sieve surface.

SUMMARY OF THE INVENTION

These objects are attained according to the invention by forming the sieve bottom as a slotted hole sheet whose slots have a width of <1.0 mm and a length of 0.5 to 4 mm. Alternatively, the sieve bottom is a fine hole sheet with noncircular perforations having a largest dimension or so-called diameter of <2.0 mm.

No special sieve bottoms need therefore be produced for an overflow sieve, i.e. for an arcuate sieve of the type described, but use can be made of slotted hole sheets or finely perforate sheets which are already manufactured and used for other screen purposes. Many different kinds of prior art screens for a variety of purposes are already known, so that a large selection is available for the most varied mixtures of solids and liquids. In dependence on the application, use is made of the slotted hole sheet or fine hole sheet whichever gives the most favorable sieving results.

Advantageously the perforations can have a triangular to semi-elliptical shape, while the top side around the perforations has scale-like raised portions, the rear side having no raised portions. The result is a particularly favorable throughput.

A sieve surface practically fully free from the collection of deposits is achieved if the surface is deburred, ground and polished. In addition to the aforementioned advantages, also particularly advantageously the perforations widen in the direction of the rear side of the sieve.

Satisfactory support of the slotted or fine hole sheet and the certainty that the sieve bottoms lie quietly and are therefore not prematurely destroyed is ensured if the sieve bottom is superimposed on a grid-shaped supporting construction. The sieve bottom should be releasably attached for replacement purposes. Extremely advantageously the size, more particularly the width, of the sieve perforations or slot changes with the distance from the feeding place of the sieved material.

The slots remain substantially unobstructed—i.e., they are not partially closed or covered by the subjacent supporting sections—if the sieve bottom is superimposed on bars which are parallel with one another and have a more particularly triangular cross section, the sieve bottom underside being in linear contact with a continuous top edge of the bar.

BRIEF DESCRIPTION OF THE DRAWING

The above and other objects, features, and advantages will become more readily apparent from the following description, reference being made to the accompanying drawing in which:

FIG. 8 is a section through a not ground sheet, FIG. 8A is an elevational view from the concave side of a not ground sheet, FIG. 8B is an elevational view of the concave side of a ground sheet, and FIG. 8C is a section through a ground sheet;

FIG. 9 shows varying hole width in a section through a sieve of the invention; and FIGS. 10A, 10B and 10C show the perforations at different points along the sieve of FIG. 9 in elevation.

SPECIFIC DESCRIPTION

Figure 1:
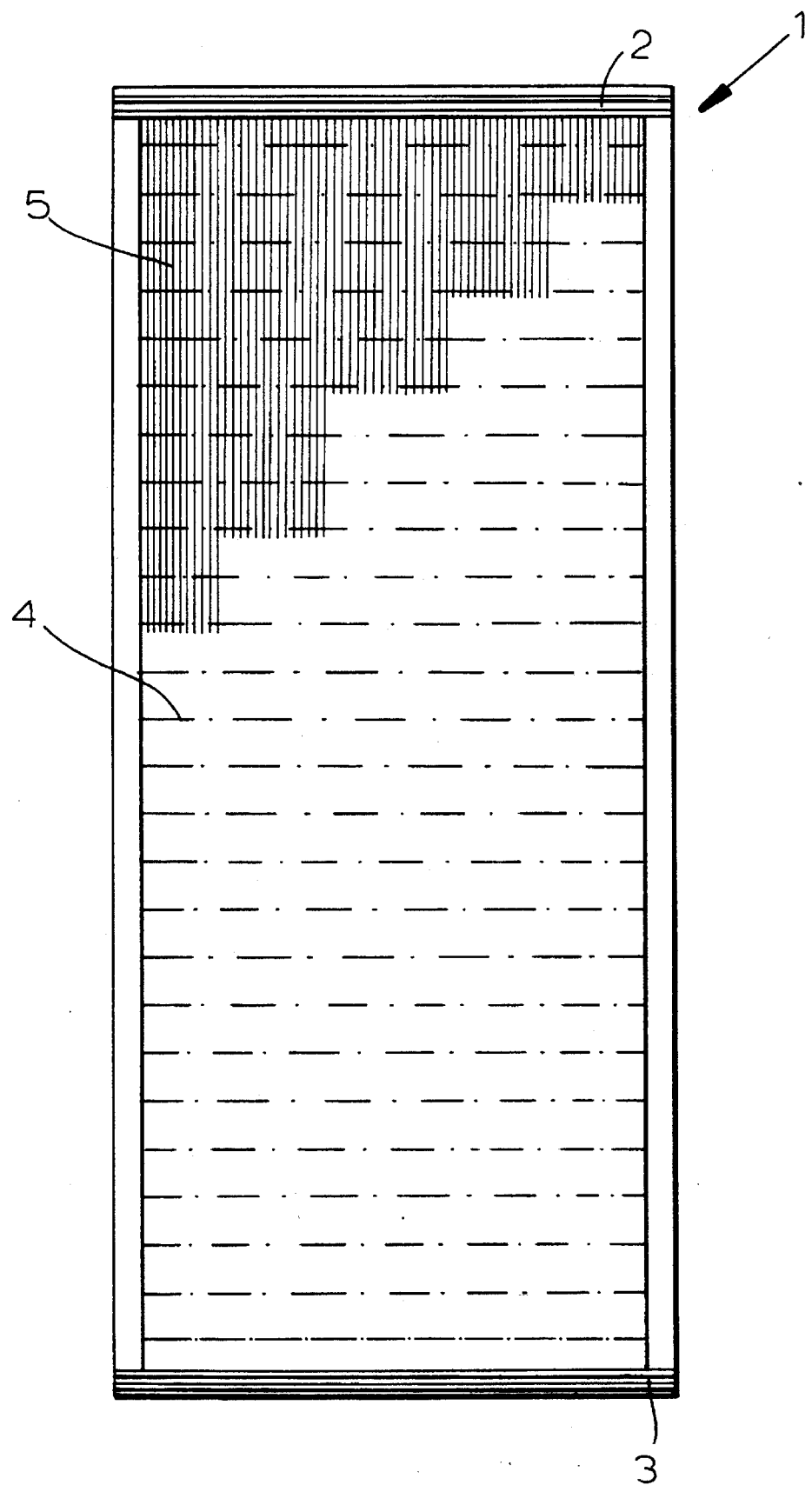
FIG. 1 is a plan view of the supporting grid of the overflow sieve.
Figure 2:
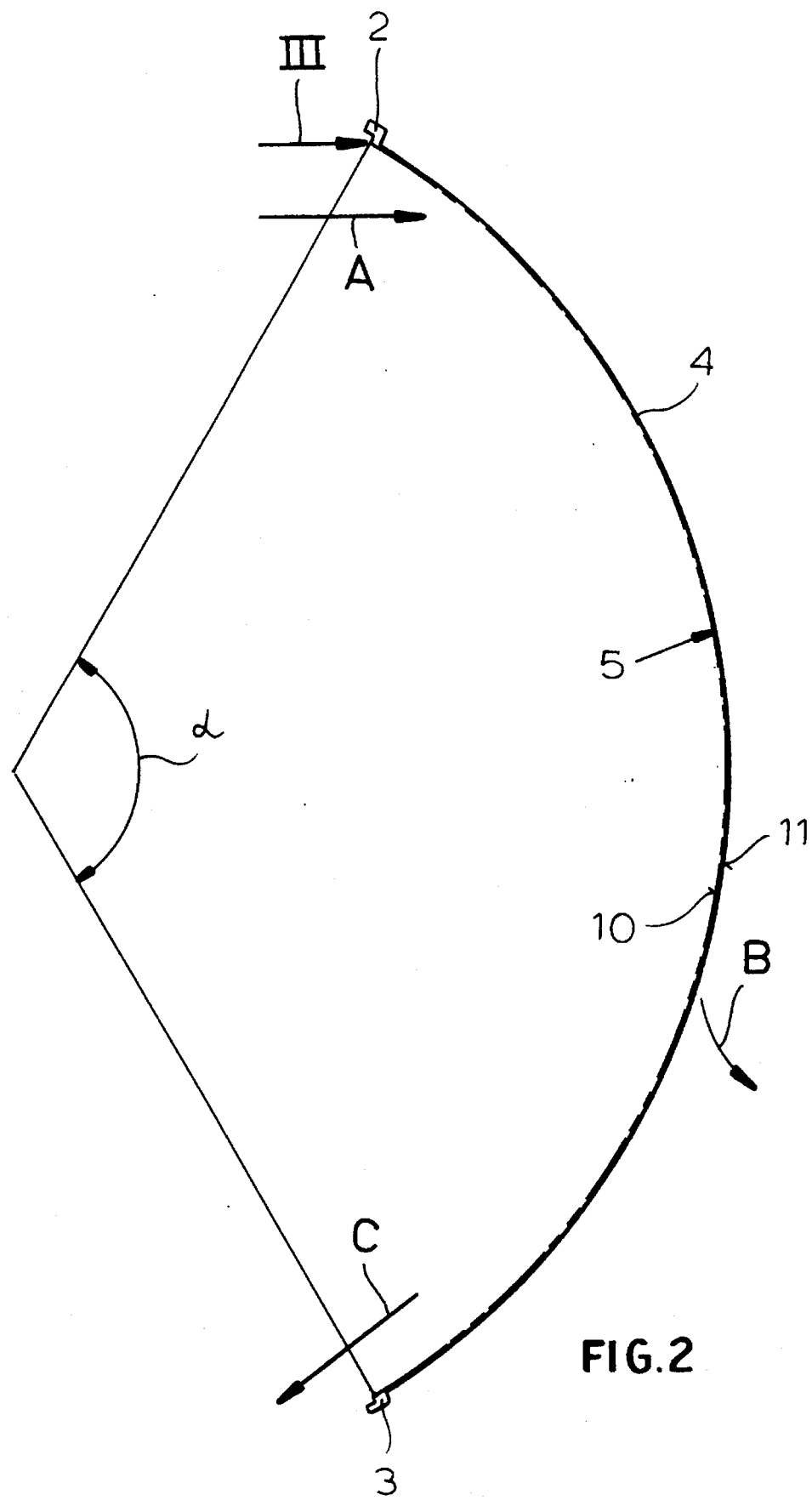
FIG. 2 is a side elevation of the overflow sieve.
Figure 3:
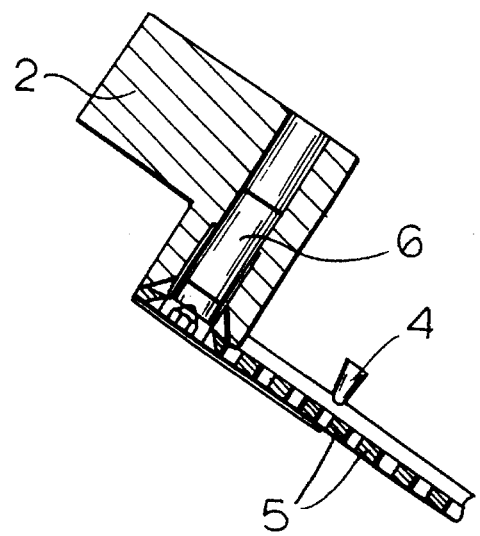
FIG. 3 is an enlarged detail of the region III from FIG. 2, seen in section.

In the embodiment illustrated in FIGS. 1–3 an overflow sieve 1 takes the form of an arcuate sieve extending between a first rail 2 and a second rail 3, each of L-shaped cross section. Attached between the rails 2, 3 is a grid-shaped supporting construction of bars 4 triangular in cross section, onto which a sieve bottom 5 is laid from and releasably attached to the rails 2 by screws 6. The sieve frame must therefore be incorporated into an installation only once, thereafter remaining therein, since the frame is not exposed to any wear. Only the sieve bottom—i.e., the sieve sheets—are interchanged. The sheet is only in line contact with the bars 4, so that the open surface is only minimally obstructed.

As can be seen from FIG. 2, the sieve structure has a concave side 10 and a convex side 11, extending over an arc of an arc length subtending an angle α of, say 120°. As is represented at A, means is provided for applying a mixture of solids and liquid, e.g. slurry, to the concave surface 10, the liquid passing through the perforations in the sieve bottom 5 as represented by the arrow B and thereby being collected at the convex side of the apparatus, while the solids pass along the surface of the sieve as represented by the arrow C and can be collected from the sieve bottom separately from the liquid.

Figure 4:
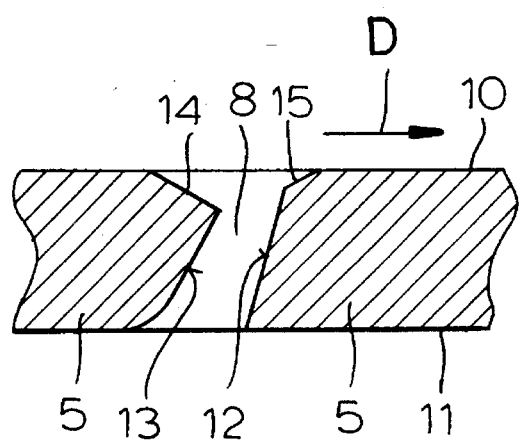
FIG. 4 is a greatly enlarged section through a slotted hole sheet.

In a first embodiment the sieve bottom is formed by a slotted hole sheet whose slots have a width of 0.06 to 0.9 mm and a length of 0.5 to 4 mm. FIGS. 8, 8A, 8B, and 8C show to an enlarged scale such a slotted hole sheet while FIG. 4 is a very greatly enlarged cross section of an opening in a slotted hole sheet.

Alternatively, the sieve bottom used can also be a fine hole sheet whose noncircular perforations have a large width or major diameter of 0.06 to 2.0 mm. The apertures have a triangular to semi-elliptical shape and the top side of the fine hole sheet has around the perforations scale-like raised portions, so that liquid is conducted along said raised portions an through the perforations, as shown in FIGS. 6A, 6B and 7-7C. In contrast, the rear side is smooth.

In both embodiments the perforations widen in the direction of the rear side of the sieve, as shown in FIGS. 4, 5, 6A, 6B, 7-7C and 8-8C. At least the top side of the sieve bottom is deburred and polished (FIG. 7B and FIG. 8B). Furthermore, the size of the perforation, especially its width, can change, i.e. become larger (see FIGS. 9, 10A, 10B, 10C), with the distance from the feeding place of the material to be sieved, to achieve an even better sieving performance and therefore improved removal of water.

Advantageously the sieve bottom can be constructed in one piece and therefore extend as a single member from the first rail 2 to the second rail 3. The sieve bottom can be inserted in many different ways—i.e., it can on the one hand be so rotated that the zone bearing against the first rail thereafter bears shown at 8a-8b, progressively increase in width in the rotated toward the front side. As a result, it is not only possible to change the kind and performance of the sieve, but a heavily worn zone can also be replaced by a less stressed zone.

Such an overflow sieve, more particularly an arcuate sieve, can be particularly advantageously used for solids/liquid separations of the most various kinds such as, for example, the separation of fibers, granulates and clarified sludge.

In FIG. 4, I have shown one of the slots or slotted holes 8 of a sieve bottom 5 which has its back or convex side at 11 and its front or concave side at 10. As can be seen from FIG. 4, the flanks 12 and 13 of the slot 8 can diverge from the surface 10 toward the surface 11, i.e. in the direction of flow of the liquid through the slot.

A lip 14 at the upstream side with respect to flow of material along the concave surface 10 (arrow D) may be slightly depressed so that the opposite edge 15 of the slot can project above this lip forming the scale-like raised portion mentioned previously.

Figure 5:
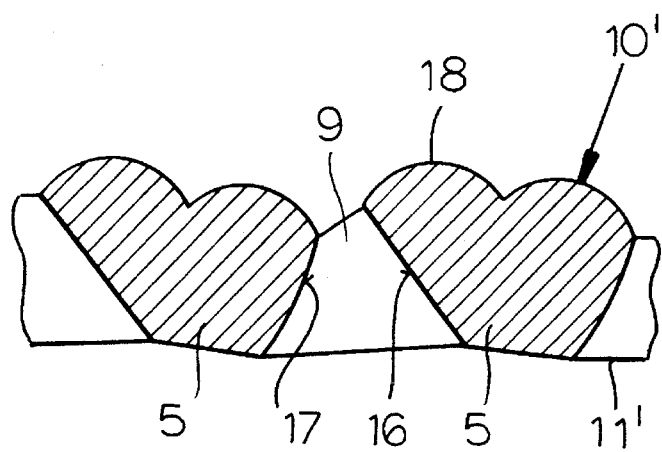
FIG. 5 is a greatly enlarged section through a fine hole sheet.
Figure 6A:
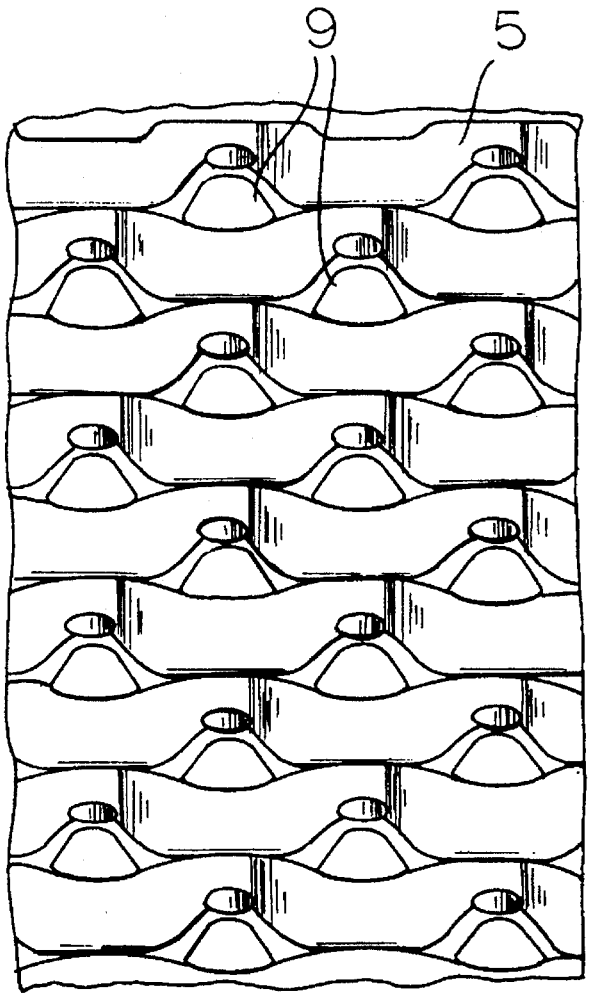
FIG. 6A is an elevational view and FIG. 6B is a section through a fine hole sheet.
Figure 6B:
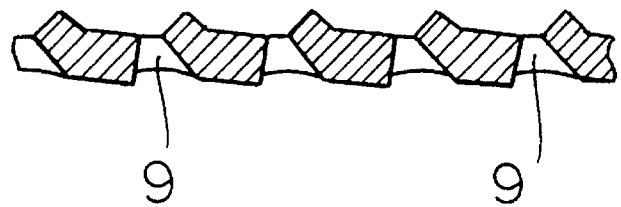
Figure 7D:
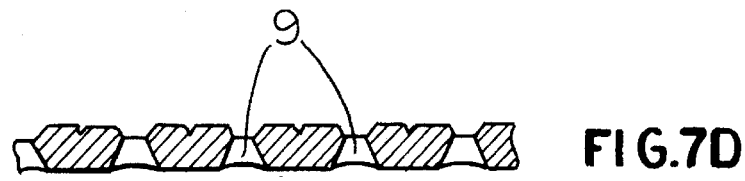
FIG. 7 is a section through a not ground sheet.
FIG. 7A is an elevational view from the concave side of a not ground sheet.
FIG. 7B is an elevational view of the concave side of a ground sheet.
FIG. 7C is a section through a ground sheet.
Figure 7A:
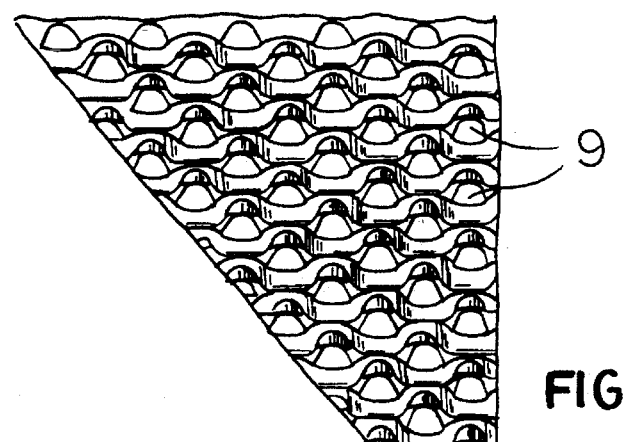
Figure 7B:
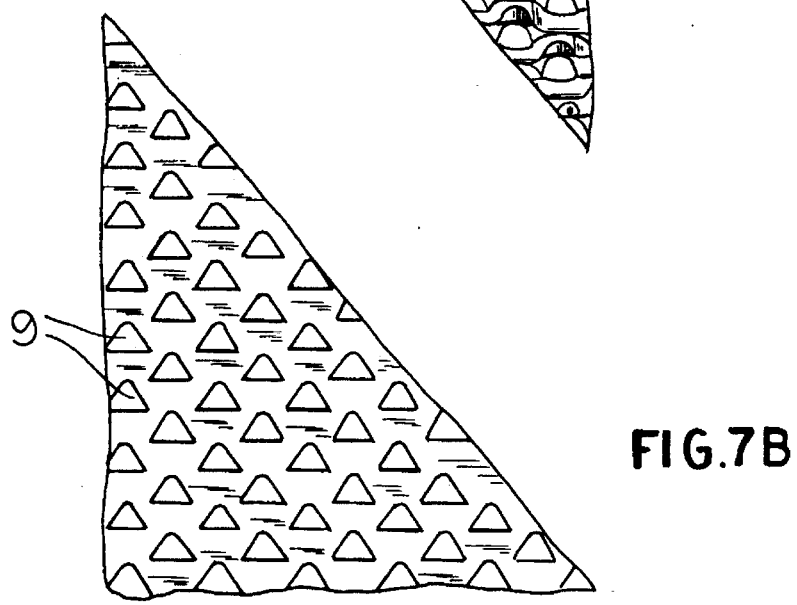
Figure 7C:
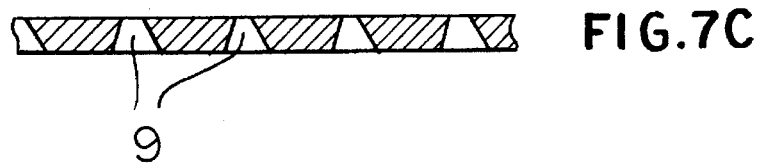

A somewhat different construction provides the perforation 9 for the perforated sheet of FIG. 5. Here the flanks 16, 17 diverge in a frustoconical pattern while the concave surface 10' is provided with humps 18 which generate the scale-like portion. The convex side 11' of this sheet is relatively more smooth.

From FIG. 9 it will be apparent that the openings here shown at 8a-8b, progressively increase in width in the direction of flow (arrow D) along the sieve bottom. The width becomes larger with the distance from the feeding point A of the material to be separated. In FIG. 9, the reference numeral 4 identifies both longitudinal bars (shown in elevation) and transverse bars (shown in section) of the supporting grid. As a comparison of FIGS. 10A-10C will show, the size of the perforations and especially the width can change along the sieve in the direction of flow.

We claim:

1. An overflow sieve, comprising:

a support structure extending over an arc and having a concave side and a convex side, said support structure comprising an array of transversely spaced arcuate longitudinal bars extending between opposite rails, each of said bars being individually of triangular cross section, and transverse bars perpendicular to said longitudinal bars and forming a grid with the longitudinal bars;

a sieve bottom fitted onto said support structure along said concave side and constituted of a perforate sheet formed with noncircular openings in an array distributed over said sheet, said sieve bottom having a concave surface and a convex surface, said convex surface being in linear contact with apexes of said individual longitudinal bars, said transverse bars being spaced from said convex surface, said openings being selected from:

slots having a width <1.0 mm and a length of 0.5 to 4 mm of a slotted hole sheet, and noncircular perforations with a greatest width of <2 mm;

means for releasably attaching said sieve bottom to said support structures at said rails so as to enable replacement of said sheet; and means for applying a mixture of solids and liquid to said concave surface.

2. The overflow sieve defined in claim 1 wherein the openings have shapes which are generally triangular.

3. The overflow sieve defined in claim 1 wherein the openings have shapes which are generally oval.

4. The overflow sieve defined in claim 1 wherein the openings have shapes which are generally semi-elliptical.

5. The overflow sieve defined in claim 1 wherein said concave surface has scale-like raised portions adjacent said opening and said convex surface is free from raised portions.

6. The overflow sieve defined in claim 1 wherein said concave surface has a deburred and polished surface.

7. The overflow sieve defined in claim 1 wherein said openings widen toward said convex surface.

8. The overflow sieve defined in claim 1 wherein said openings are of a size which increases with a distance form a region at which said mixture is applied to said concave surface.

9. The overflow sieve defined in claim 8 wherein the variation in size is a variation in width of said opening.

* * * * *